US005101103A

United States Patent [19]

Johnson et al.

[11] Patent Number: 5,101,103

[45] Date of Patent: Mar. 31, 1992

[54] MICROWAVE INTERACTION MODULE, NOTABLY FOR AN ATOMIC OR MOLECULAR BEAM RESONATOR

[75] Inventors: Leland Johnson, Chaux-de-Fonds; Pierre Thomann, Fontainemelon, both of Switzerland

[73] Assignee: Oscilloquartz S.A., Neuchatel, Switzerland

[21] Appl. No.: 489,810

[22] Filed: Mar. 6, 1990

[30] Foreign Application Priority Data

Mar. 13, 1989 [FR] France ............................... 89 03366

[51] Int. Cl.[5] ............................................ H01S 1/00

[52] U.S. Cl. ................................................ 250/251

[58] Field of Search ............... 250/251, 423 R; 315/5; 331/93

[56] References Cited

U.S. PATENT DOCUMENTS 3,397,310 8/1968 Holloway ........................... 250/251

3,407,295 10/1968 Lacey ................................ 250/251

3,967,115 10/1976 Kern .................................. 250/251

4,354,108 10/1982 Toyama et al. ..................... 250/251

*Primary Examiner*—Jack I. Berman

*Assistant Examiner*—Kiet T. Nguyen

*Attorney, Agent, or Firm*—Weil, Gotshal & Manges

[57] ABSTRACT

A microwave interaction module has a magnetic shield in which is created a constant magnetic field (the "C field"), an an electromagnetic cavity for generating a radiofrequency magnetic field in the path of beam of atomic or molecular particles. The electromagnetic cavity comprises a first U-shaped wave-guide, the extremities of which are provided with apertures for the passage of the beam of particles, and a second wave-guide connected electromagnetically to the first wave-guide by a connecting aperture made in the upper face of the first wave-guide. The entire electromagnetic cavity is thus within the magnetic sield and the radiofrequency signal is carried by a coaxial cable passing through this shield.

7 Claims, 3 Drawing Sheets

MICROWAVE INTERACTION MODULE, NOTABLY FOR AN ATOMIC OR MOLECULAR BEAM RESONATOR

FIELD OF THE INVENTION

The present invention relates to a microwave interaction module. Such modules are used notably in atomic beam or molecular beam resonators.

Atomic beam resonators are described in documents DE-AS-1260049, US-3670171 and CH-599712. These resonators operate with cesium, thallium or rubidium atoms, or with ammonia molecules.

BACKGROUND OF THE INVENTION

The principle of an atomic or molecular beam resonator consists of detecting a resonance in a hyperfine energy state of the atom or molecule in order to obtain a standard frequency. For this purpose the particles are emitted in vapour form from a source and then concentrated into a narrow beam by a collimator. The beam of particles passes through a first energy state selecting magnet, commonly referred to as the A magnet, which selects the particles having a certain first energy state. These particles are directed to a microwave interaction module in which they are subjected firstly to a constant magnetic field, commonly referred to as the C field, and secondly to an interrogation magnetic field. When the frequency of this interrogation magnetic field is equal to a resonance frequency of the particles, the latter undergo a transition from the first energy state to a second certain energy state. The beam of particles emerging from the microwave interaction module then passes through a second state selector, commonly referred to as the B magnet, which selects the particles having the second energy state to direct them to a detector. The number of particles detected is used for producing a command signal of the frequency of an oscillator which emits, to the microwave interaction module, an electrical signal generating the interrogation magnetic field. In this way an oscillator is obtained the frequency of which is controlled by the resonance frequency of the particles.

DESCRIPTION OF THE PRIOR ART

FIG. 1 shows a microwave interaction module of conventional type in longitudinal section.

This microwave interaction module comprises a magnetic shield of parallelepipedic form consisting of a base 100*a* and a cap 100*b*, this shield having two apertures 102 and 104 for the passage of the beam of particles, a constant magnetic field source comprising one or more coils 106 connected through an aperture 108 to a source of continuous current (not shown) outside the magnetic shield, and an electromagnetic Ramsey cavity 108.

This electromagnetic cavity is formed principally of hollow tubes 2, 16, 22 of rectangular section of a non-magnetic material, such as copper or monel metal. A first tube 2 bent in the form of a U has at each of its two extremities two apertures 4, 6, 8, 10 which are in alignment in order to permit the passage through them of the beam of particles along the axis 12. The first tube also comprises on one of its faces a connecting aperture 14, located equidistant from its two extremities, onto which is brazed one extremity of the second tube 16. The connecting aperture 14 has precisely the dimensions of the transverse section of the tube 16.

Almost the whole of the electromagnetic cavity is mounted on the inner face of the vacuum chamber 18 of the resonator by means of a mounting plate 20 and a spacer ring 21. The electromagnetic cavity comprises, however, a portion outside the vacuum chamber 18 and outside the magnetic shield 100*a*-100*b* consisting of a portion of hollow tube 22 of rectangular section in extension of the tube 16. This portion includes an impedance adjustment screw 24, a damping adjustment screw 26 and a connector for accepting a coaxial cable carrying the electromagnetic control signal issued by the oscillator. At the junction with the vacuum chamber 18, the seal is provided by a joint 32 and a microwave window 34.

The electromagnetic cavity thus comprises three wave-guide portions: a trunk formed by the tubes 16 and 22, and two identical arms formed by the two halves of tube 2 which extend on each side of the connection aperture 14.

The electromagnetic cavity further comprises short-circuit endplates 36, 38 and 40 enclosing the free extremities of the tubes, together with small wave-guides 42, 44, 46 and 48 brazed onto apertures 4, 6, 8 and 10 respectively.

The microwave module of known type shown in FIG. 1 has a certain number of disadvantages.

Firstly, the microwave window 34 represents a significant mechanical problem: on the one hand it forms part of the resonant cavity; it is therefore important that it is not subjected to any constraint which would be liable to modify the adjustment of the cavity. On the other hand, it forms part of the vacuum chamber 18 to which it must be soldered; this operation invariably creates significant strains in the assembled parts. This problem is usually resolved by interposing a flexible element of the bellows or membrane type (not shown in FIG. 1, but described in the above mentioned German patent DE-AS-1260049) between the resonant structure and the sealed envelope. This solution, although effective, involves a complicated manufacturing process (number of component parts, strict dimensional tolerances) and a significant sacrifice in magnetic shielding efficiency.

OBJECTS OF THE INVENTION

The principal object of the invention is to simplify the assembly of the resonator, a further object is to improve the magnetic shielding factor.

BRIEF SUMMARY OF THE INVENTION

This object is achieved by modifying the geometry of the electromagnetic cavity by attaching the trunk not to the lower face (facing the base) of the rectangular tube forming the arms of the cavity, as is the case in all known electromagnetic cavities, but by attaching the trunk to the opposite face of this tube.

More precisely, the object of the invention is a microwave interaction module for causing atomic or molecular particles to interact with a radiofrequency magnetic field comprising:

- a magnetic shield comprising a base and a cap, the latter being provided with an entry aperture and an exit aperture for the passage of a beam of the said particles,
- a magnetic field source for generating within the magnetic shield a constant magnetic field,
- an electromagnetic cavity comprising a first portion consisting of a wave-guide of U-shape and of rectangular section having a lower face facing the base of the shield, an upper face opposite to the lower face and two lateral faces, the lower and upper faces each being pierced by an aperture in the proximity of each extremity of the wave-guide for the passage of the beam of particles, and a second portion consisting of a linear wave-guide of rectangular section, wherein the two portions being electromagnetically connected by a connecting aperture made in the upper face of first portion, an open extremity in the second portion being located facing this connecting aperture, and the electromagnetic cavity being entirely within the magnetic shield, the latter having an aperture for the passage of a coaxial cable carrying an electromagnetic signal from outside the shield to the second portion in order to generate the said radiofrequency magnetic field.

BRIEF DESCRIPTION OF THE DRAWINGS

The characteristics and advantages of the invention will become clear from the following description, which is of an illustrative but not limitative nature, with reference to the attached drawings, in which.

DETAILED DESCRIPTION OF THE INVENTION

Figure 1:
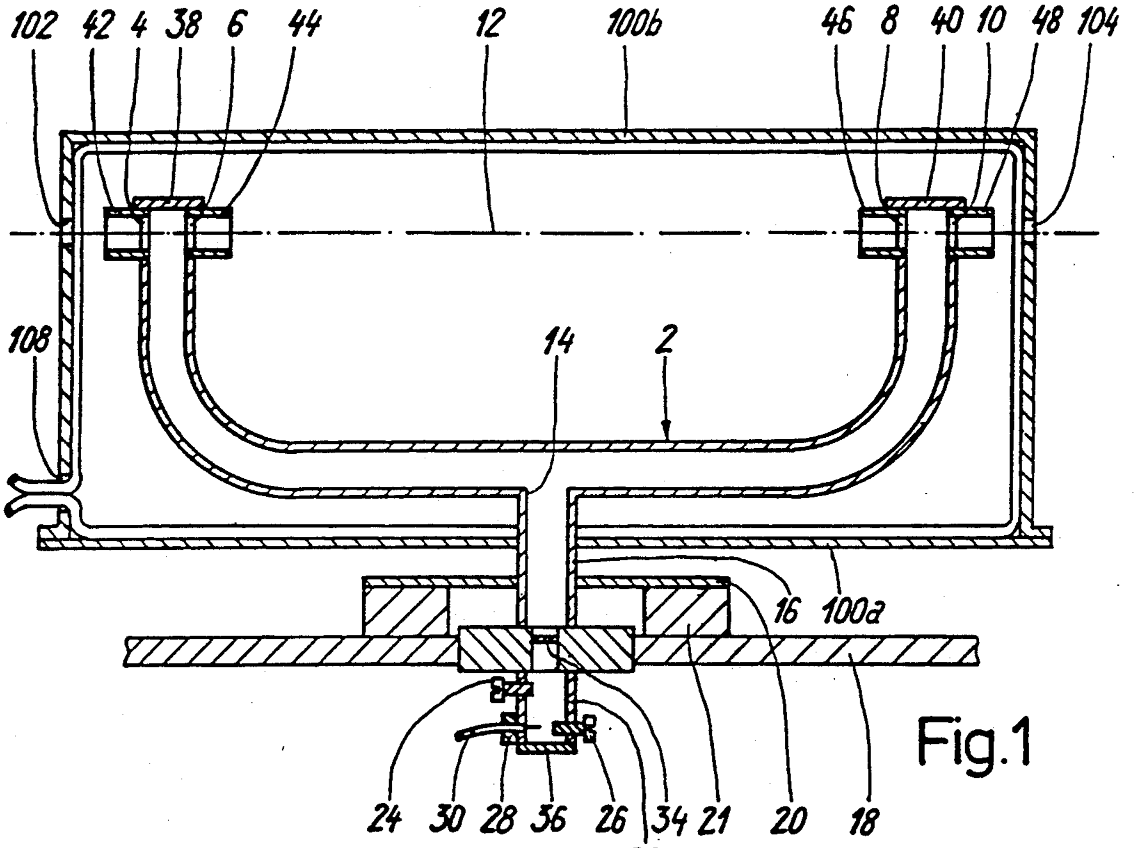
FIG. 1, already described, is a longitudinal section of a known microwave interaction module.
Figure 2:
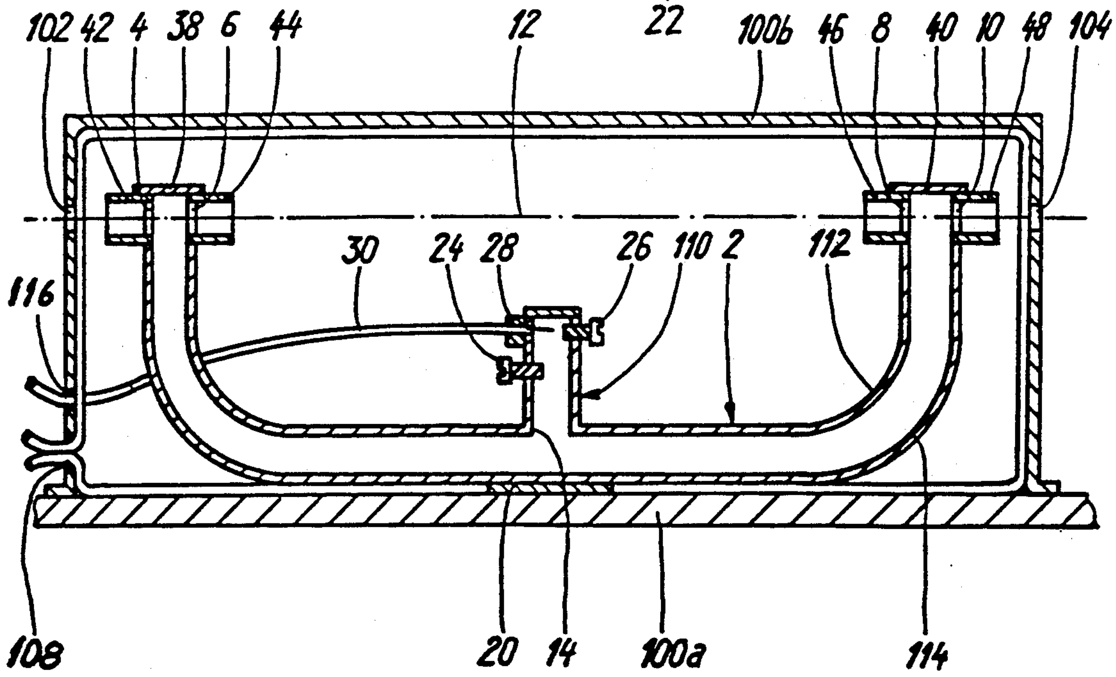
FIG. 2 is a longitudinal section of a microwave interaction module in accordance with the invention.

The microwave interaction module in accordance with the invention, shown in longitudinal section in FIG. 2, comprises a magnetic shield consisting of a base 100*a* and a cap 100*b*, the latter having two apertures 102 and 104 for the passage of the beam of particles. A constant magnetic field ("the C field") is created in the microwave interaction module by an assembly of coils such as 106; these coils are connected to an electrical source outside the shield through an aperture 108.

The microwave interaction module finally comprises an electromagnetic cavity comprising a first hollow rectangular tube 2, folded into U-shape and constituting the two arms of the cavity, and a second hollow rectangular tube 110 which constitutes the trunk of the cavity. These tubes are wave-guides in non-magnetic material such as copper or monel metal.

According to the invention, the connecting aperture 14 is pierced in the upper face 112 of the hollow tube 2, opposite to the lower face 114 which is facing the base 100*a*. This structural design permits the elimination of the aperture for passage of the trunk from the electromagnetic cavity through the vacuum chamber and the magnetic shield. The consequence is a simplification of the assembly, elimination of mechanical constraints due to the direct mounting of the electromagnetic cavity on the vacuum chamber in the prior art, and an improvement of the magnetic shielding factor.

In the conventional manner, the extremities of the tube 2 are enclosed by short-circuit end plates 38, 40, and small wave-guides 42, 44, 46 and 48 aligned on a common axis 12 are brazed onto the apertures 4, 6, 8 and 10 made in the proximity of the extremities of the tube 2. This axis 12 corresponds with the trajectory of the beam of atomic or molecular particles from the resonator.

Similarly, the tube 110 comprises an impedence adjustment screw 24, a damping adjustment screw 26 and a connector 28 accepting a coaxial cable 30 carrying the electromagnetic signal from the oscillator of the resonator.

This coaxial cable passes through the magnetic shield by an aperture 116. This aperture is of the order of 10 $mm^2$, which represents a significant reduction by comparison with the apertures of the order of 300 $mm^2$ which are made in structures according to the prior art for passage of the trunk of the electromagnetic cavity.

Furthermore, the aperture 116 for passage of the coaxial cable may be pierced in any one of the walls of the magnetic shield. It is thus possible to select freely the location of this aperture, depending on the direction of the lines of the C field, so as to minimise the interference created by this aperture.

It is important to note that, in accordance with the invention, the electromagnetic cavity and the coaxial cable form an independent unit in which the impedence adjustment and the damping adjustment can be performed before the assembly of the resonator. This is not the case with known designs in which the electromagnetic cavity must first be mounted in the resonator. This therefore has the advantage that, as distinct from known designs, it is not necessary to regulate the impedance and damping adjustments when coupling the resonator to the microwave generator.

With regard to the manufacture of the cavity, it is known that the two arms must have exactly the same electrical length for the cavity to be able to function correctly. In fact, a length difference of 0.01 millimetre incurs a relative uncertainty of the order of $10^{-13}$ on the resonance frequency which generally represents the maximum tolerable uncertainty. This equalisation of the arms constitutes the most intricate stage in the manufacture of the electromagnetic cavity.

Conventionally this manufacture proceeds in the following way. The tube 2, having its extremities open, is bent into the desired form and the apertures 4, 6, 8, 10 together with the connecting aperture 14 are made. The second tube 16 is then brazed onto the aperture 14.

Next, using the microwave measurement methods conventionally used in this branch of science, the difference in electrical length is determined of the two arms of tube 2 at the frequency at which the cavity is to be used in the resonator (temporary short-circuit end plates are placed at the extremities of the two arms during this measurement). If the result is that the two arms are not of exactly the same electrical length, the arm which is too long is shortened by the desired length by milling and the equality of the arm lengths is again checked by microwave measurement. This operation may be repeated several times until the two arms have identical lengths.

The final stage consists of brazing the short-circuit end plates onto the extremities of the tubes, and the small wave-guides onto the apertures for passage of the beam of particles.

Figure 3:
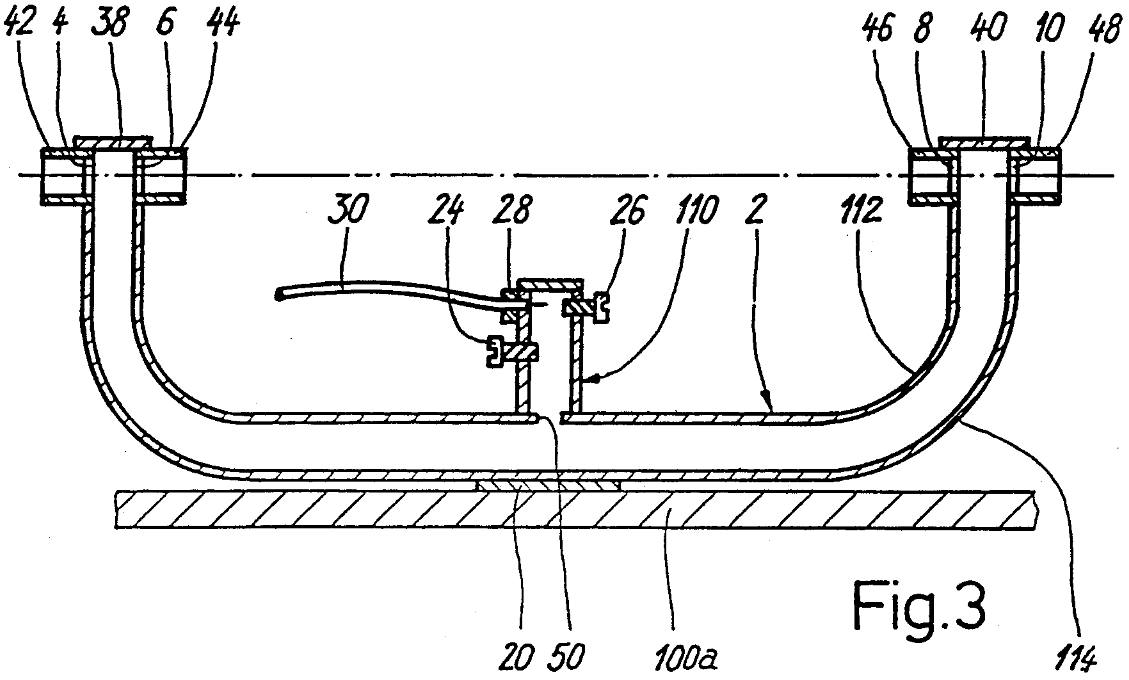
FIG. 3 is a longitudinal section illustrating a variant embodiment of the microwave interaction module of FIG. 2.
Figure 4:
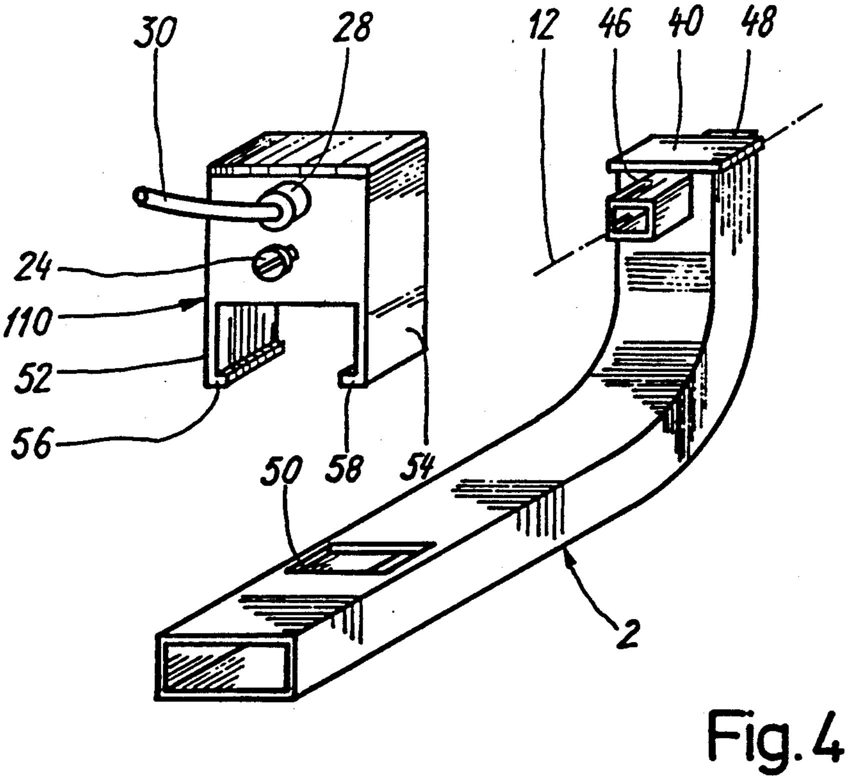
FIG. 4 is a partial perspective view of the electromagnetic cavity shown in FIG. 3.

FIG. 3 shows a longitudinal section and FIG. 4 a perspective view of an embodiment variant of the electromagnetic cavity which permits its manufacture to be simplified. in particular which permits the operation of equalising the two arms to be made easier.

The modification consists of replacing the connecting aperture 14 (FIG. 2) with a connecting slit 50 of dimension smaller than the transverse section of the trunk of the cavity.

This slit is more clearly shown in FIG. 4. Its shorter side is parallel to the longitudinal axis of the tube 2 and its longer side is parallel to the longer side of the transverse section of this tube. As an example, the width 1 of this slit is 4 millimetres and the width L of the trunk is 12 millimetres, whereas the length of the slit is substantially equal to the length of the longer side of the section of the tube.

In the embodiment shown in FIG. 4, the tube 2 is bent in a plane parallel to the shorter sides of the tubes and the slit is made in a longer side of the section of the tube 2. It is well understood that the tube may also be bent in a plane parallel to the longer sides of the tubes and in this case, the slit is made in a shorter side of the tube 2.

As may be seen in FIG. 4, the trunk 110 comprises, on two opposite faces of the tube, extensions 52, 54 terminating in raised edges 56, 58 extending towards the inside of the tube. These elements are used for mounting the electromagnetic cavity in accordance with the following manufacturing process.

The two arms of the electromagnetic cavity are first made, piercing the apertures 4, 6, 8 and 10 together with the connecting slit 50, in a hollow rectangular bent tube open at its two extremities. The short-circuit end plates are then brazed onto the free extremities of the arms and of the trunk and the small wave-guides onto the apertures for passage of the beam of particles.

The trunk of the electromagnetic cavity is then made of another hollow rectangular tube. To facilitate the mounting of the trunk on the arms, the extensions 52. 54 and the raised edges 56, 58 are made at one extremity of the trunk. These extensions are obtained by cutting out the two other faces of the tube and the raised edges 56, 58 are formed by the folding of the extremity of these extensions 52, 54.

The extensions 52, 54 possess some flexibility which allows the trunk 110 to form a joint with the tube 2. The configurations of the elements 52, 54, 56 and 58 are such as to hold the trunk on the tube 2, whilst permitting the trunk to slide along the longitudinal axis of the tube 2.

The next stage consists of adjusting the position of the trunk so that the electrical lengths of the two arms are equal. For this purpose the electromagnetic cavity is placed on a microwave measurement bench in order to measure the difference between the electrical lengths of the two arms, and simultaneously the trunk is shifted along the tube 2 to a position which cancels out this difference.

It is to be noted that this control procedure takes account of the short-circuit end plates 36, 38 and 40 which are brazed on before the arm equalisation operation, as distinct from the process of equalisation by milling.

It must also be noted that the ratio between the movement amplitude of the trunk and the difference in the electrical lengths of the arms is greater than one. This ratio is of the order of 3 to 10; it depends on the width of the slit. When the ratio value is 3, then a variation in the difference between the electrical lengths of the arms of 0.01 millimetre is produced by shifting the trunk 0.03 millimetre. The presence of the slit thus creates an amplification effect which facilitates the adjustment of the electrical lengths of the arms.

The final stage in the manufacturing process consists of brazing the trunk with the arms in the position determined by the control procedure.

In the embodiment shown in FIGS. 3 and 4, the trunk 110 is mounted on the tube 2 by joint-forming elements consisting of the extensions 52. 54 and the raised edges 56, 58. Of course, other means of mounting the trunk 16 on the tube 2 can be used. For example it is possible to eliminate the raised edges 56, 58 and fold the extensions 52 and 54 slightly towards one another in such a way that during mounting they grip the tube 2.

Figure 5:
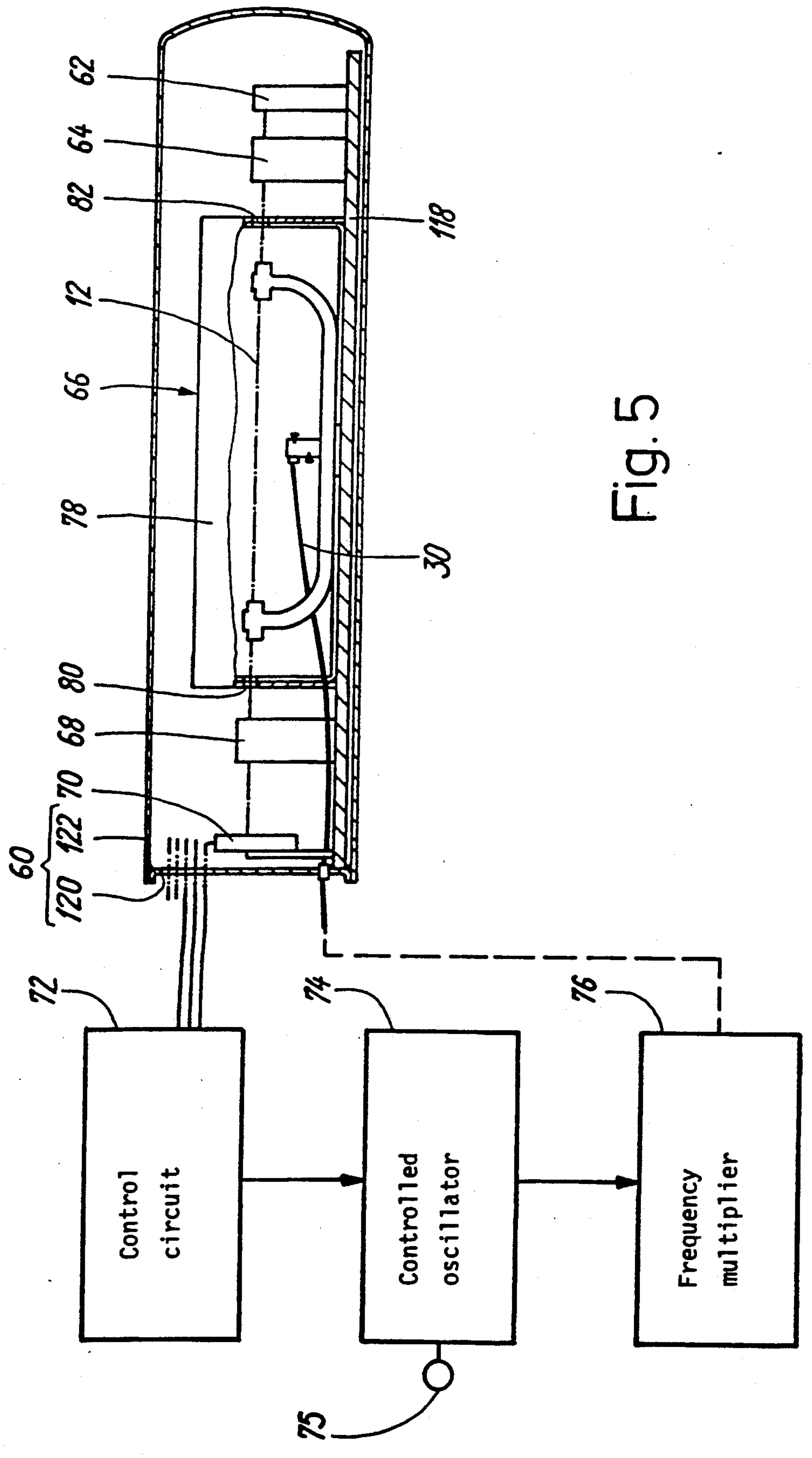
FIG. 5 represents in diagram form a particle beam resonator comprising a microwave interaction module in accordance with the invention.

The interaction module in accordance with the invention, as described, constitutes an element of a particle beam resonator, one embodiment of which is shown in longitudinal section in FIG. 5.

This resonator comprises, in a vacuum chamber 60, a source 62 of particles (atomic or molecular), a first state selector 64, a microwave interaction module 66, a second state selector 68 and a detector 70. It also comprises outside the chamber 60 a servo circuit consisting of a control circuit 72 for controlling the frequency of an oscillator 74 as a function of a signal issued by the detector 70, and a frequency multiplier 76 to convert the frequency of the signal delivered by the oscillator to the frequency necessary for inducing an energy state transition of the particles.

The source 62 comprises an oven for producing the particles in vapour form and a collimator for forming a beam of particles having the form of a narrow bundle. The first state selector, commonly referred to as the A magnet, produces an intense non-homogeneous magnetic field perpendicular to the particle beam. It thus permits only the particles possessing a first specified energy state to be directed to he microwave interaction module 66.

This module comprises a magnetic shield 78 having two apertures 80, 82 to permit the entry and exit of the particle beam, an assembly of coils 84 through which an electrical current passes in order to form a static magnetic field, referred to as the C field, generally perpendicular to the axis of the particle beam and an electromagnetic cavity 86, referred to as a Ramsey cavity, in which a control magnetic field prevails of frequency close to the atomic transition frequency of the particles from the first energy state into a second energy state.

On leaving the microwave interaction module 66, the particles are subjected to a magnetic field generated by a second state selector, similar to the first and referred to as the B magnet, the function of which is to deflect the particles so that only the particles that have undergone a transition of energy state are directed to the detector 70.

When the frequency of the signal delivered by the frequency multiplier 76 is equal to the transition frequency between the two energy states of the particles, the number of particles received by the detector 70 is great. Conversely, if the frequency of the signal delivered by the frequency multiplier 76 does not correspond to the transition frequency, the particles do not undergo a transition of energy state and the detector 70 does not receive any particles. The number of particles received by the detector 70 is thus used by the control circuit 72 to control the frequency of the oscillator 74 and consequently the frequency of the control magnetic field. The frequency of the oscillator is generally 5 to 10 MHz. This signal is available on a port 75.

In the case of the particles being cesium atoms, the transition between the energy states ($F=4, m_F=0$) and ($F=3, m_F=0$) is generally used. The frequency of the corresponding control signal is close to 9.19263177 GHz.

The electromagnetic cavity in accordance with the invention is not coupled to the vacuum chamber 60 as this cavity is now located entirely within the microwave interaction module 66. This enables the construction of the resonator to be appreciably simplified.

In fact, the internal elements of the resonator, namely the oven 62, the state selectors 64, 68, the microwave interaction module 66 and the detector 70 can all be monted on a very rigid carrier element 118 consisting of a rail or a thick plate, which enables the alignment stability of these internal elements to be guaranteed under all circumstances.

Furthermore, all the passages for the electrical supply to the various internal elements, including the coaxial cable 30 carrying the control signal to the electromagnetic cavity, are arranged on a plate 120 forming one extremity of the vacuum chamber and mechanically forming one piece with the carrier element 118.

Finally, the vacuum chamber is composed, apart from the plate 120, solely of a cylindrical hood 122 which, on completion of the operations for mounting the internal elements, is soldered onto the plate 120. The seal of the chamber is thus ensured by a single soldered seam. This enhances the reliability of the seal.

Finally, it should be noted that the vacuum chamber can be made of material of high magnetic permeability in order to form a supplementary magnetic screen.

The electromagnetic cavity in accordance with the invention can be used in a resonator as described with reference to FIG. 5, but it can also be used equally well in a resonator with optical pumping. This resonator is of similar structural design to that illustrated in FIG. 4, the only difference being that the state selectors 64 and 68 are replaced by optical pumping lasers which induce a transition of the particles from the second energy state to the first energy state through the intermediary of a more energetic state. Thus, when the frequency of the control signal is correct, the particles undergo a transition from the first energy state to the second energy state in the microwave interaction module, then an inverse transition through the intermediary of the laser, replacing the state selector 68. This inverse transition causes light to be emitted. Conversely, if the frequency of the control signal does not correspond to the transition of energy state, the particles remain in the first energy state and no light emission results. Consequently, the measurement of the intensity of this light emission enables the oscillator to be controlled.

We claim:

1. A microwave interaction module for causing the interaction of atomic or molecular particles with a radiofrequency magnetic field comprising:

a magnetic shield comprising a base and a cap, said cap having an entry aperture and an exit aperture for the passage of a beam of the said particles, a magnetic field source to generate a constant magnetic field within the magnetic shield, and an electromagnetic cavity comprising a first portion constituting a U-shaped wave-guide of rectangular section having a lower face facing the base of the grid, an upper face opposite the lower face and two lateral faces, the upper and lower faces each having an aperture in the proximity of each extremity of the wave-guide for the passage of the beam of particles, and a second portion constituting a linear wave-guide of rectangular section, wherein the two portions being electromagnetically connected by a connecting aperture made in the upper face of the first portion, an open extremity of the second portion being located facing this connecting aperture, and the electromagnetic cavity being entirely within the magnetic shield, the latter having an aperture for the passage of a coaxial cable carrying an electromagnetic signal from the exterior of the shield to the second portion to generate the said radiofrequency magnetic field.

2. A module in accordance with claim 1, wherein said first portion consists of a first bent tube and the second portion consists of a second tube mounted on the first tube.

3. A module in accordance with claim 1, wherein the connecting aperture of the electromagnetic cavity has dimensions corresponding to the transverse section of the second tube.

4. A module in accordance with claim 2, wherein the connecting aperture of the electromagnetic cavity is a connecting slit of a width less than the transverse section of the said second tube.

5. A module in accordance with claim 4, wherein the connecting slit is parallel to the longer side of the section of the trunk and being of a length substantially equal to this longer side and of a width less than the length of the shorter side of the section of the trunk.

6. A module in accordance with claim 4, wherein the second tube comprises, at one of its extremities, two extensions extending from two opposing faces, these extensions cooperating to grip the first tube.

7. A module in accordance with claim 5, wherein the second tube comprises, at one of its extremities, two parallel extensions extending from two opposing faces, these extensions terminating in raised edges which enable the joint of the first tube onto the second tube to be made.

* * * * *